June 9, 1936.  J. A. M. IBAÑEZ VALENZUELA  2,043,910
MEANS FOR DETERMINING STRESSES IN A LOADED STRUCTURE
Filed Dec. 14, 1932   2 Sheets-Sheet 1
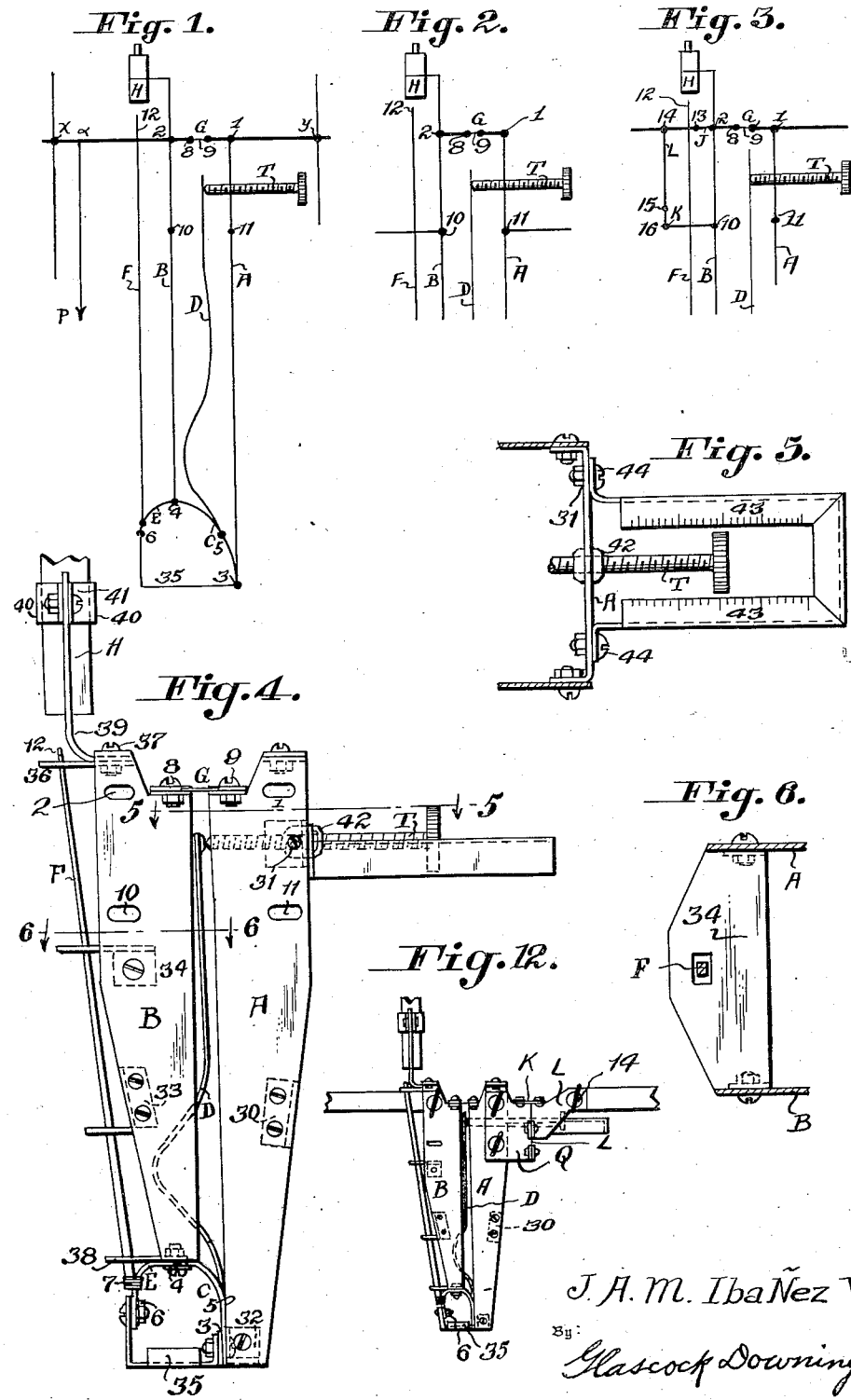

June 9, 1936. J. A. M. IBAÑEZ VALENZUELA 2,043,910
MEANS FOR DETERMINING STRESSES IN A LOADED STRUCTURE
Filed Dec. 14, 1932  2 Sheets-Sheet 2
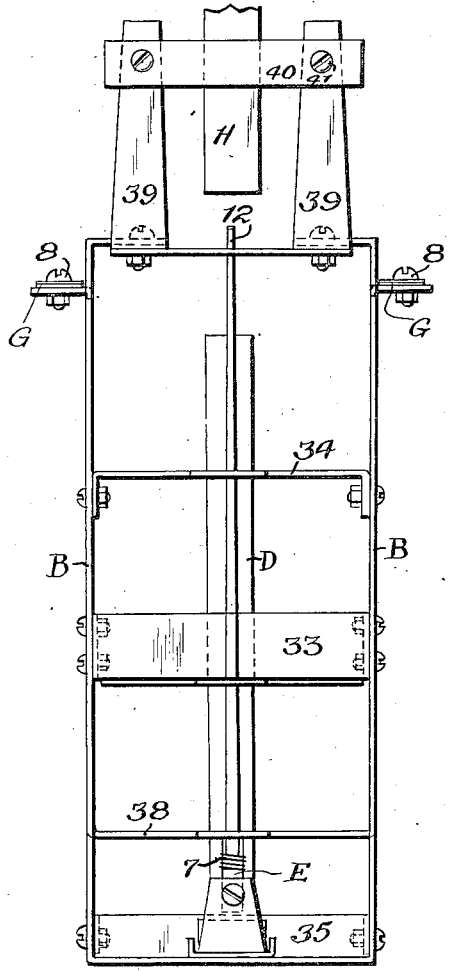
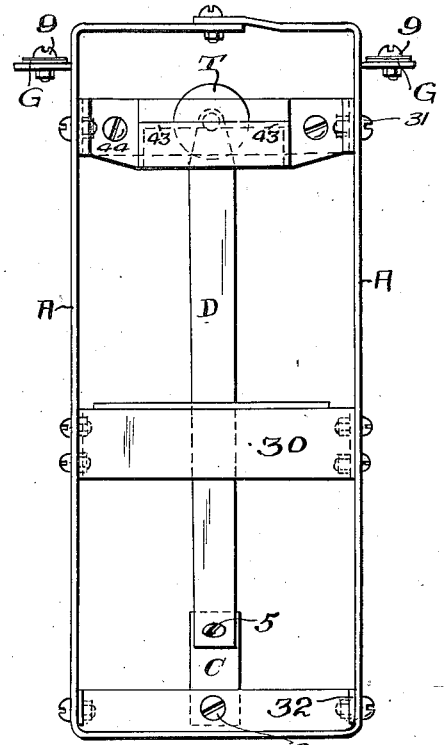
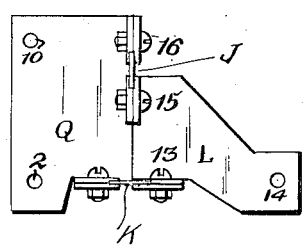
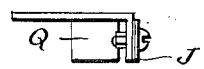
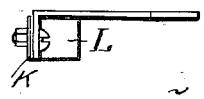
J. A. M. Ibañez Valenzuela
Inventor
By Glascock Downing & Seebold
Attys.

Patented June 9, 1936

2,043,910

UNITED STATES PATENT OFFICE 2,043,910

MEANS FOR DETERMINING STRESSES IN A LOADED STRUCTURE

Julio Augusto Miguel Ibañez Valenzuela, Providencia, Santiago, Chile

Application December 14, 1932, Serial No. 647,286
In Chile November 12, 1932

6 Claims. (Cl. 73—151)

This invention relates to the direct measurement of bending moments, shearing forces, thrusts and tensions to which any part of a loaded structure may be subjected.

Hitherto these have been determined by divers systems the most accurate of which is generally the analytical method, in many cases requiring complicated calculations which sometimes end in approximate and even indeterminate results. To facilitate this work tables have been published with formulæ which simplify the calculations of rigid frames and arches; but these tables, besides the fact that they rarely include a particular case just as it may occur, nearly always lead to tedious calculations. If no analytical solution is found, simplifications are resorted to in detriment of the required accuracy.

Another system proposed for determining these moments and stresses based on the observation of the internal mechanical phenomena developed in structures under stress, is that of photo-elastic measurements. In this method scale models are constructed of transparent material, specially of glass, which are submitted to the action of external forces. As the different stresses produce alterations in the bi-refraction of the transparent material, these have enabled one to determine the deformations and stresses with errors under 3%. But although this method is very efficient, it is necessary in every case to have an exactly reproduced transparent model of the structure which rather complicates the process.

Still another practical method has been devised, which consists in the direct measurement of deflection in model structures, this method requiring the use of tables for the calculation of moments and stresses.

The object of the present invention is to provide a simple and practical means of rapidly and directly determining the bending moments, shearing forces and other stresses acting on any member or part of such structure. This means consists of a measuring instrument of special construction which is located at any part of a scale model of the structure and which measures directly the bending moments and other stresses in that part.

One form of embodying the present invention is illustrated in the accompanying drawings in which:

Figures 1, 2 and 3 illustrate schematically the measuring instrument located on a member of the scale model of the structure; Figure 4 is an enlarged side elevational view of the stress-measuring instrument; Figure 5 is a cross sectional view taken on line 5—5 of Figure 4 in the direction in which the arrow points; Figure 6 is a cross sectional view taken on the line 6—6 of Figure 4 in the direction in which the arrow points; Figure 7 is an end elevational view of the stress-measuring instrument looking towards one side thereof; Figure 8 is a similar view looking towards the opposite side; Figure 9 is a side elevational view of an attachment for association with the instrument for the measuring of shearing forces; Figure 10 is a top plan detail of the part of the arrangement shown in Figure 9; Figure 11 is a top plan view of another part of the device shown in Figure 9; Figure 12 is a side elevational view showing the device for measuring the shearing forces attached to the measuring instrument.

The measuring instrument is composed of two main rigid frame members, made of any strong and light material, placed facing each other. These frames are joined together at one point by means of a flexible or hinged joint, which for the present purpose may be advantageously made with a laminated spring, and preferably, as shown in G, Figure 4, of a piece of sheet steel rigidly fixed to the frame. The principal members of the instrument are connected to the model at the part where measurements are to be made, and where a gap is formed in the corresponding member of the model for the purpose of rigidly connecting the instrument frames to the gap ends of that member. Also, the frame members of the instrument are joined by an elastic ligament which permits their relative rotation round the hinged joint when subjected to moments. The elastic ligament may be effected by means of a laminated steel spring.

Mounted on the rigid members, some adjustable moment applying means must be provided acting to apply a countermoment to those members round the hinged joint to reduce to zero the said relative rotation of the principal members, these adjustable means consisting of a laminated spring connecting the principal members and pressed at one point by a measuring screw or any other known adjustable means. Indicating means are also provided to determine the relative position of the principal members.

Figure 1 is a schematic drawing of the instrument in position for measuring bending moments. Let $x\,y$ be a member positioned between two joints in a model of any undetermined system, i. e. a horizontal or a vertical member of a rigid frame. A and B represent the two frames of the instrument, which are rigidly connected at 1 and 2 to the free ends of member x y where the gap is left. G is a flexible plate rigidly joined to A at 9 and to B at 8 which allows the rotation of A and B round the centre of plate or joint G. A force P acting at point α in member x y produces at the middle point of the elastic plate G a bending moment, positive or negative, say negative. A will tend to rotate round the centre of G in a clockwise direction and B in the contrary direction. C is a spring rigidly united to A at 3 and to B at 4, and which is deformed with this rotation; D is a spring rigidly connected to C at 5 and which always presses against a measuring screw T, this pressure increasing by the deformation of C. E is another spring fixed to A at 6 and to B at 4, which moves an index needle F, the free end of which is observed through a microscope H. The rotation of A and B round the centre of G produces a displacement of point 4 to the right, and of point 6 to the left, which causes a deformation of E that will move point 12 to the right. Now, if screw T is turned so as to make it advance towards the left the pressure so applied by this screw will deform D and this will deform C in such a manner that point 4 will be moved to the left and point 3 to the right with an intensity of pressure proportional to the displacement of screw T. It will be easily understood that this counter pressure can be adjusted to produce an equilibrium of the bending moment at the centre of G due to load P, in which case the angle formed between A and B will be the same as that existing between them before load P was applied; this may be verified on observing that the needle point 12 will return to its original position. The space through which screw T had to be moved to re-establish the relative positions of A and B gives the measurement of the bending moment at the centre of G produced by load P. A graduated drum attached to T increases the precision of the readings. Microscope H will increase the precision with which the return of point 12 to its original position is observed. An empirical calibration of the instrument can be made with the application of known bending moments, with which different positions of the graduated screw may be observed.

The measuring instrument connected to the model structure in the manner described, provides an elastic means whereby the rotation due to the bending moment at any point of a member of the model structure caused by any external force or combination of forces can be annulled by the pressure exerted with the graduated screw on the combined springs of the instrument, in such a way that this rotation being exactly reduced to zero, the bending moment may be read off on a graduated scale which shows the corresponding displacement of the screw.

The bending moment thus obtained in the model multiplied by the existing relation between the dimensions of the reproduced structure and those of the model is the value of the bending moment, which load P would have produced in the structure if acting in the same relative position.

Also if the model be submitted to any combination of loads similar to those that the structure will support, the moments and stresses indicated by the instrument multiplied by the scale of loads and of reduction of the model, will give the moments and stresses of the structure.

Regarding the axial stresses, in the case just considered these are entirely absorbed by spring G without its being deformed in any way. If instead of rigidly connecting 1 and 2 of A and B respectively with the free ends of x y the points 10 and 11 are connected thereto as shown in Figure 2, the axial stresses in x y will produce a moment equal to their value multiplied by the distance between the alignments 10—11 and 2—1. This moment is algebraically added to the bending moment and the instrument so connected measures that sum. The knowledge of the simple bending moment obtained with the instrument connected as in Figure 1 will enable one to determine the value of the additional moment due to the longitudinal stress from the different measurements obtained in each case.

With regard to the determination of shearing forces, the instrument must be connected to the model at points 10 and 14, as shown in Figure 3 in which L is an angular arm with its elbows at 14 joined to B by an elastic plate J which is rigidly fixed to B at 2 and to L at 13, L being also joined to plate K which is rigidly fixed to B at 16 and to L at 15. With this arrangement an additional moment round the centre of J is obtained, due to the shearing force at 14. This moment is equal to the product of the shearing force by the distance between point 13 and the centre of J. As the instrument indicates the sum of this moment plus the bending moment, the determination of the shearing force will be done in the same manner as that indicated for the longitudinal stresses.

Figure 4 shows a side view of the instrument. A and B are the frame members, which are preferably made of duraluminum. Frame A is stayed at 30 and 31 by cross pieces of the same material. Cross member 30 is of angular section and members 31 and 32 are of plane section, all being rigidly joined to A by screws, rivets or any other suitable way. Frame B is shorter than frame A and is stayed with a cross angle section member 33 and a flat member 34 joined in the same manner as 31 and 32. G is a laminated spring fixed at 9 to a lug of frame A with a washer plate held by a screw. This spring is similarly joined to B at 8, forming thus a connection between A and B. C is a laminated spring joined to cross piece 32 of frame A at 3 and to frame B at 4, in the same manner as joints at 8 and 9 are made. D is another laminated spring joined to C at 5. At the other end of D there is an indentation for receiving the end of screw T. The curvature noticeable in spring D is for the purpose of its following the straight line motion of the end of screw T when this is turned. 35 is an angular piece which has a horizontal channel section part and a vertical plane section part. This piece must be considered as a prolongation of frame A and is joined to 32 at its middle point. A laminated spring E is joined to piece 35 at 6 and to frame B at 4 and is held in a similar manner as springs C and G. F is the index needle, made of wood or some such light material, joined to E at 7 by copper wire or in any other adequate way. The end 12 of the needle has a sharp metal point or a hair or spider's thread arrangement, or any other such device which may serve for determining its position by means of a microscope. A sheet metal piece 36 fixed to frame B at 37, the prolongation 38 of B and cross pieces 33 and 34 give the necessary protection to the needle, which passes through slits in these parts, as shown in Figure 14. The curved hook 39 joined to B at 37 supports the metal pieces 40 which hold a microscope tube. Centrally placed in cross piece 31 is screw T which is made of duralumin and is threaded to that piece at 42, as shown in Figure 5. The graduated drum attached is divided into 100 parts and advances between two graduated scales 43 which must indicate the measure of the screw's displacement, or the bending moment to which the instrument is subjected when the needle point is at its origin. Plates 43, 43 also protect the screw and are connected to cross piece 31 at 44 (Figure 5). Apertures 1 and 11 in frame A and 2 and 10 in frame 13 receive the ends of the model members adjacent to the measuring instrument.

In Figs. 9 to 12 there is illustrated a device for attachment to an instrument for the measurement of shearing forces. Plate Q is of duralumin and is connected to plate L of the same metal, by laminated springs J and K which are similar to laminated spring G which connects A and B. Apertures 2 and 10 allow the screwing up of Q to A or to B, at 1 and 11 or at 2 and 10 respectively. Aperture 14 in this case replaces apertures 1 or 2 for facilitating the screw connection of the instrument with the model.

The instrument designed and used in accordance with the present invention permits the measurement of the effect of external loads or forces acting in such structures as straight beams and girders, continuous or supported in any way, Virenden girders and of the Gerber system; with solid webs or braced; hinged or rigid arches and vaults with constant or variable moments, and built of any kind of material; rigid frames, roof trusses, etc. In short, this system may be considered the simplest for determining moments and stresses in all cases.

But the advantage of its use is more obvious in cases where undeterminable effects in certain structures complicate and even render impossible analytical calculations. The fundamental advantage of the system consists, therefore, in the total suppression of these calculations.

A further advantage is derived from this last; namely, that it stimulates the adoption of constructional designs of more underterminded stability, which are generally the most economical. Finally, the simplicity and exactness of these practical measurments allow the comparison of many structures, determining the effects of external forces on all the necessary sections, and by this a further economy is obtained.

Actual measurements made with an aluminum instrument and universal model made in accordance with the foregoing specification have enabled one to establish the moments and other stresses for a bridge girder of two 10-meter spans and 5 meters in depth, with errors not exceeding 2% of the figures obtained by actual analytical calculations made when the bridge was designed.

Care must be taken to erect the model with the relative stiffness of its members corresponding to that of the structure for which a proper selection of model members must be made. It is also convenient to maintain a uniform temperature in the laboratory. The effect of changes of temperature may be determined by altering the position of the supports, or by observing the alterations due to their changes.

Having now particularly described and ascertained the nature of my said invention, and in what manner the same is to be performed, I declare that what I claim is:

1. A stress-measuring instrument for attachment at a gap in a member of a scale model comprising two rigid principal members, a joint substantially swingably connecting these members, adjustable moment applying means mounted on the rigid members and adapted to apply moments to these members round the swingable joint and indicating means to determine the relative position of the principal rigid members.

2. A measuring instrument as claimed in claim 1 in which the swingable joint of the principal members of the measuring instrument, consists of a laminated spring connecting the principal members together.

3. A measuring instrument as claimed in claim 1, in which the adjustable moment applying means acting to apply moments to the principal members round the swingable joint consists of a spring operably connected to the said members, and a measuring screw connected to one of the principal members and pressing against the spring.

4. A measuring instrument as claimed in claim 1, in which the indicating means to determine the relative position of the principal members consists of a laminated spring connecting the principal members, a pointer connected to this spring at one point and a microscope to observe the pointer movements.

5. In a measuring instrument comprising two rigid principal members vertically disposed in parallel spaced relation, a joint substantially swingably connected with the upper extremities of said members and consisting of a laminated spring fixed at its ends to said members, a spring member connecting the lower ends of said members to allow relative movement of the said latter ends toward and from each other when the principal members are subjected to efforts acting toward or from said ends, adjustable pressure applying means mounted on the rigid members and acting to apply counter-pressure thereto to reduce to zero the said relative movements of the ends of the principal members and including another spring member one end of which is fixed to the spring member connecting the lower ends of the principal members while the other end is disposed between and near the upper ends of the principal members, an adjustable screw mounted on one of the principal members and in contacting engagement with the last mentioned spring member, and indicating means associated with said principal members to determine the relative position of the principal members.

6. A measuring instrument in accordance with claim 5, wherein the indicating means consist of a spring member connecting the lower extremities of the rigid members and responsive to relative movements thereof, a pointer one end of which is fixed to the last mentioned spring member, and a microscope mounted on one of said rigid members above said pointer in order that the position of the point of the pointer may be observed during the application of the original external load and during the application of the counter-pressure.

JULIO AUGUSTO
MIGUEL IBAÑEZ VALENZUELA.